US012368803B2

(12) United States Patent
Sorrentino

(10) Patent No.: US 12,368,803 B2
(45) Date of Patent: Jul. 22, 2025

(54) SYSTEMS AND METHODS FOR PROVIDING REMOTE CALL CENTER SERVICES

(71) Applicant: 1125855 ALBERTA LIMITED, Edmonton (CA)

(72) Inventor: Peter Sorrentino, Garibaldi Highlands (CA)

(73) Assignee: 1125855 Alberta Limited, Edmonton (CA)

( * ) Notice: Subject to any disclaimer, the term of this patent is extended or adjusted under 35 U.S.C. 154(b) by 194 days.

(21) Appl. No.: 18/044,403

(22) PCT Filed: Sep. 9, 2021

(86) PCT No.: PCT/CA2021/051246
§ 371 (c)(1),
(2) Date: Mar. 8, 2023

(87) PCT Pub. No.: WO2022/051853
PCT Pub. Date: Mar. 17, 2022

(65) Prior Publication Data
US 2023/0262165 A1    Aug. 17, 2023

Related U.S. Application Data

(60) Provisional application No. 63/076,188, filed on Sep. 9, 2020.

(51) Int. Cl.
*H04M 3/51* (2006.01)
*H04M 3/42* (2006.01)
*H04M 3/523* (2006.01)

(52) U.S. Cl.
CPC ..... *H04M 3/5133* (2013.01); *H04M 3/42068* (2013.01); *H04M 3/523* (2013.01);
(Continued)

(58) Field of Classification Search
None
See application file for complete search history.

(56) References Cited

U.S. PATENT DOCUMENTS 6,934,379 B2    8/2005    Falcon et al.
8,068,598 B1    11/2011   Russi et al.
(Continued)

FOREIGN PATENT DOCUMENTS

EP    2763436 A1    8/2014
WO    2018236625 A1    12/2018

*Primary Examiner* — Quynh H Nguyen
(74) *Attorney, Agent, or Firm* — Todd A. Rattray; Oyen Wiggs Green & Mutala LLP

(57) ABSTRACT

An example system for performing call center tasks with the assistance of a human operator comprises a plurality of remote electronic devices and a system server. Each of the plurality of remote electronic devices has a speaker, a microphone and a screen. The system server has a data store configured to store personal information and a dialing platform configured to connect the remote electronic devices with customer devices. The system server may transmit fragments of personal information to the remote electronic device and the remote electronic device may display the fragments of personal information on its screen as the human operator engages in the call with the customer over the remote electronic device.

17 Claims, 10 Drawing Sheets

(52) U.S. Cl.
CPC ............... *H04M 2203/6009* (2013.01); *H04M 2203/6045* (2013.01)

(56) References Cited

U.S. PATENT DOCUMENTS

| | | | |
|---|---|---|---|
| 8,548,818 | B2 | 10/2013 | Wagner et al. |
| 8,649,501 | B1* | 2/2014 | Whitaker ............ H04M 3/5158 |
| | | | 379/265.11 |
| 8,745,698 | B1 | 6/2014 | Ashfield et al. |
| 9,245,287 | B2 | 1/2016 | Gechter et al. |
| 9,532,209 | B2 | 12/2016 | Aleksin et al. |
| 9,621,495 | B1* | 4/2017 | Shumate ............... H04L 51/046 |
| 9,621,735 | B2 | 4/2017 | Ting et al. |
| 9,894,199 | B1 | 2/2018 | Wiechman et al. |
| 2010/0153446 | A1 | 6/2010 | Kondziela |
| 2013/0244632 | A1 | 9/2013 | Spence et al. |
| 2016/0155188 | A1* | 6/2016 | Ramakrishna ........ H04L 9/3215 |
| | | | 705/75 |
| 2016/0277392 | A1 | 9/2016 | Knauss |
| 2017/0017964 | A1 | 1/2017 | Janefalkar et al. |
| 2017/0330191 | A1 | 11/2017 | Pender et al. |
| 2017/0346948 | A1 | 11/2017 | Wolf |
| 2019/0149662 | A1* | 5/2019 | Mandic ............... H04M 3/5231 |
| | | | 379/266.07 |

* cited by examiner

SYSTEMS AND METHODS FOR PROVIDING REMOTE CALL CENTER SERVICES

CROSS-REFERENCE TO RELATED APPLICATIONS

This application claims priority from U.S. application No. 63/076,188 filed 9 Sep. 2020 and entitled SYSTEMS AND METHODS FOR PROVIDING REMOTE CALL CENTER SERVICES which is hereby incorporated herein by reference for all purposes. For purposes of the United States of America, this application claims the benefit under 35 U.S.C. § 119 of U.S. application No. 63/076,188 filed 9 Sep. 2020 and entitled SYSTEMS AND METHODS FOR PROVIDING REMOTE CALL CENTER SERVICES.

TECHNICAL FIELD

The present invention relates generally to communication systems, and more particularly, to systems and methods for providing remote call center services.

BACKGROUND

Call centers are centralized offices which receive or deliver large volumes of inquiries by telephone. It is common for companies to run call centers as part of their business model or as a component of their core business. For example, some companies may run inbound call centers which administer incoming product support, information inquiries, etc. As another example, some companies may run outbound call centers for market research, debt collection, solicitations of new products, etc.

Companies which run brick and mortar call centers typically incur significant costs associated with recruiting new agents, training the agents, and retaining the trained agents. Due to the repetitive nature of a call center agent's job and undesirably crowded working environments, retaining qualified call center agents can be challenging. As a result, there is usually a shortage of qualified agents in the call center industry.

A shortage of qualified agents can introduce several issues for call centers. One issue is that companies which employ call center agents typically need to pay its agents by the hour instead of based on commissions (i.e. based on positive call outcomes). Another issue is that access to some call centers may be limited to specific times during the day. Another issue is that "wait" or "hold" times for some call centers can be undesirably long. Another issue is that operating brick and mortar call centers can be costly in situations like a pandemic where social distancing measures are required. While companies have contemplated solutions like using computerized auto-dialers to deliver pre-recorded messages, these solutions are typically not effective in producing positive call outcomes and are typically limited due to security and privacy concerns (e.g.

confidential information cannot be delivered automatically without verifying the identity of the individual). Computerized auto-dialers can also be blocked easily by telecommunication service companies and/or third-party technology providers.

There is a general need for cost-effective systems and methods for providing call center services with human operators. There is also a need for systems and methods which enable an operator to perform certain call center tasks remotely. In particular, there is a need for systems that can verify the identity of a customer over a call without disclosing personal information about the customer to the operator engaging in the call.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Aspects of the invention include, without limitation:
 systems and methods for providing remote call center services;
 systems and methods for computer-implemented verification of persons' identities with human assistance;
 systems and methods for verifying the identity of a customer over a voice call;
 systems and methods for generating identity verification questions which are suitable for presentation or display on an electronic device; and
 systems and methods for securely presenting or displaying personal information on an electronic device to help facilitate an identity verification process.

One aspect of the invention provides a system for performing call center tasks with the assistance of a human operator. The system comprises a system server in communication with multiple remote electronic devices over a network. The remote electronic devices have a speaker, a microphone and a screen. The system server has a data store configured to store customer profiles. Each of the customer profiles comprise personal information about a customer, the customer's phone number, and identity verification questions. The system server also has a dialing platform configured to connect the remote electronic device with a customer device through a second network to initiate a voice call between a human operator operating the remote electronic device and a customer operating the customer device. The system server is configured to transmit the identity verification questions to the remote electronic device after the remote electronic device establishes connection with the customer device through the dialing platform. The remote electronic device is configured to sequentially display the identity verification questions on the screen of the remote electronic device as the human operator is engaging in the voice call with the customer.

In some embodiments, the system server is configured to generate fake information based on personal information about the customer. The identity verification questions may comprise the generated fake information.

In some embodiments, the system server further comprises a calling queue configured to store the customer's phone number. The dialing platform may be configured to connect the remote electronic device with the customer device by dialing a random phone number from the calling queue. In some embodiments, the remote electronic device is configured to delete the identity verification questions from the remote electronic device after the voice call is terminated. In some embodiments, the identity verification questions are generated by including only fragments of the customer's personal information.

In some embodiments, the data store is configured to store a corresponding correct answer option and one or more corresponding incorrect answer options for each of the identity verification questions. The remote electronic device may be configured to display the correct answer option and the one or more incorrect answer options together with the identity verification question on the screen of the remote electronic device.

In some embodiments the system server is in communication with multiple remote electronic devices over an internet network and a VoIP network. In some embodiments, the dialing platform is configured to connect the remote electronic device with a customer device through a PSTN network.

Another aspect of the invention relates to a human-assisted method for verifying the identity of a customer engaging in a call with an operator over an electronic device. The method comprises transmitting a series of identity verification questions and corresponding answer options to the electronic device. The answer options include a correct answer option and one or more incorrect answer options. The series of identity verification questions are sequentially displayed on a screen of the device to prompt the operator to ask the customer the series of identity verification questions through a microphone of the device. The operator is prompted, for each question of the series of identity verification questions, to select at least one of the corresponding answer options after receiving an answer from the customer over a speaker of the device. The identity of the customer is verified based on the selected answer options.

In some embodiments, each of the series of questions comprises a piece of personal information about the customer and one or more pieces of fake information. In some embodiments, the answer options do not contain personal information about the customer. In some embodiments, the answer options comprise a "YES" option and a "NO" option. In some embodiments, the correct answer option comprises fragments of a piece of personal information and the one or more incorrect answer options comprise fake information.

Another aspect of the invention relates to a system for facilitating an anonymous call between an operator and a customer. The system comprises a system server which has a calling queue configured to store a plurality of phone numbers, a dialing platform operable to connect to the phones corresponding to the plurality of phone numbers over a first network, and an electronic device connected to the system server over a second network. The electronic device may be operated by the operator to transmit a signal to the system server over the second network. The signal prompts the dialing platform to select and dial one of the phone numbers in the calling queue to connect to a corresponding phone over the first network. The electronic device connects to the dialing platform over the second network upon the dialed phone connecting to the dialing platform.

In addition to the exemplary aspects and embodiments described above, further aspects and embodiments will become apparent by reference to the drawings and by study of the following detailed descriptions.

It is emphasized that the invention relates to all combinations of the above features, even if these are recited in different claims.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
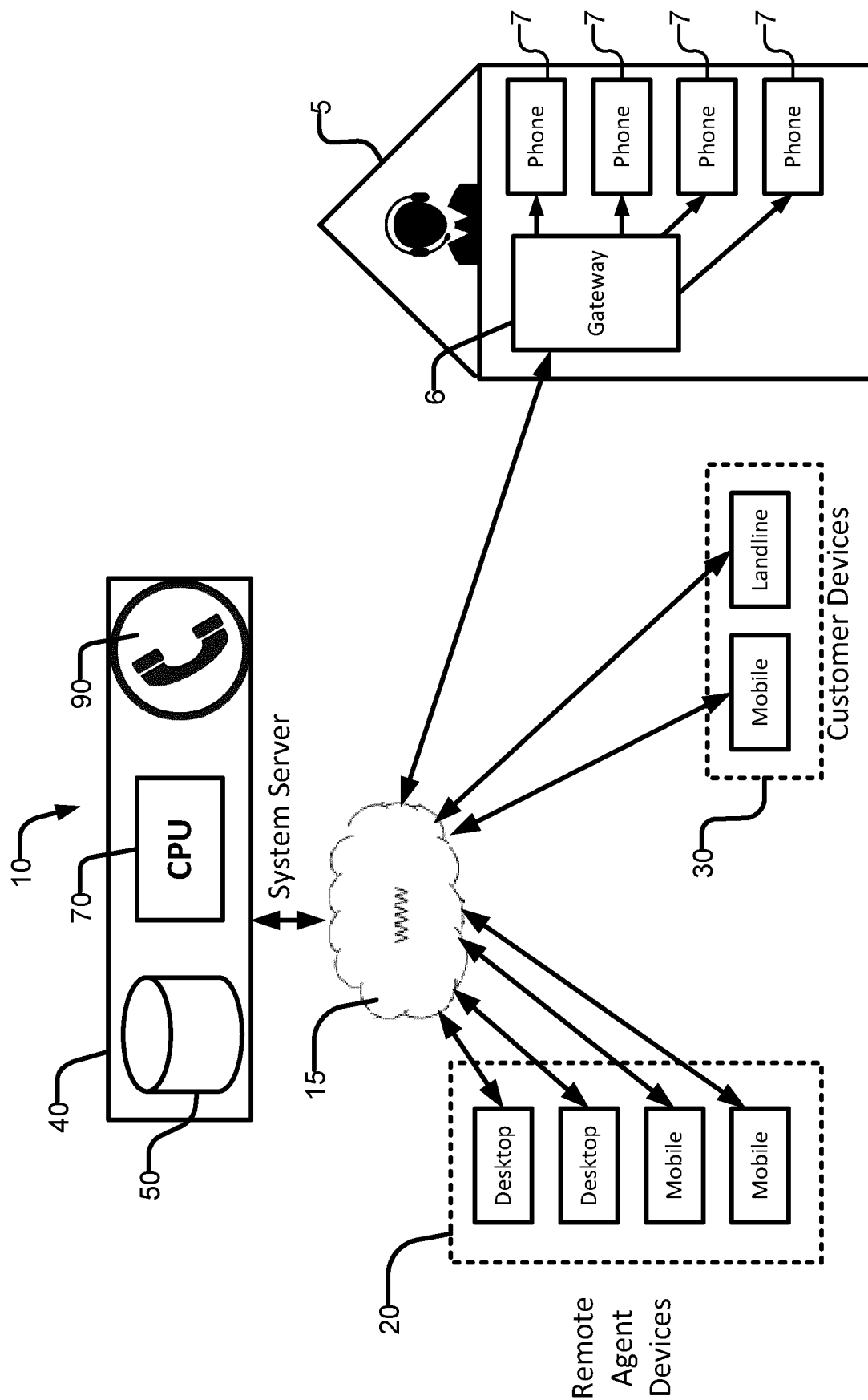
FIG. 1 is a block diagram illustrating a system for providing remote call center services according to an example embodiment.

FIG. 1 illustrates a system 10 for providing remote call center services according to an example embodiment. As shown in FIG. 1, system 10 includes a plurality of remote electronic devices 20 that can be placed in communication with customer devices 30 and a system server 40 through one or more networks 15. Networks 15 may include mobile networks 15A (e.g. code division multiple access (CDMA) networks, global system for mobile communications (GSM) networks, 3G, 4G or 5G wireless carrier networks, WiFi wireless networks, etc.), public wide area networks such as the internet network 15B (e.g. including voice over IP (VoIP) servers, web servers, application servers, database servers, etc.), private wide area networks 15C, public switched telephone networks (PSTN) 15D, etc. Unless context dictates otherwise, the term "remote electronic devices" (as used herein) refers to electronic devices which may be operated remotely (e.g. away from a traditional call center) to initiate or otherwise engage in a voice or video call with a customer (e.g. a person desiring to receive services from a call center, a person owing money, a person who needs to be contacted by a customer service representative, etc.) through their customer device 30 (e.g. a phone) over network 15. Preferably remote electronic devices 20 may be operated by a generic user (e.g. an untrained user). That is, remote electronic devices 20 may be operated by any member of the general public, including users who have not been formally trained to work as a call center agent.

Advantageously system 10 provides a semi-automated platform for providing call center services. System 10 may be applied as a platform by way of which members of the general public may take on the role of a call center operators while protecting the privacy of customers to whom the call center services are directed.

System 10 improves on fully automated dialing systems (e.g. computerized auto-dialers) by facilitating anonymous interaction between a customer and a human phone operator. Human operators are desirable because they can provide a more engaging and/or more personalized experience for customers compared to computerized operators. Consequently, human operators are usually more likely to produce positive call outcomes (e.g. more likely to successfully sell a product, more likely to successfully collect a debt, etc.) compared to computerized operators. For outbound call center services, human operators may be especially preferred over computerized operators for several reasons. One example reason is that customers are usually less likely to ignore (e.g. hang up on) a human operator than they are to ignore a computerized operator. Another related example reason is that customers are also more likely to believe in the legitimacy of a call from a human operator than a call from a computerized operator.

One aspect of the invention provides computer implemented systems and methods for performing call center tasks with the assistance of a human operator. The system may interact with the human operator by way of remote electronic device 20. Systems and methods described herein provide tools for a human operator to operate their corresponding remote electronic devices 20 to initiate or otherwise engage in calls with customers in which the generic user participates in the calls and helps the system to verify the identity of called customers without acquiring personal information about the called customers. The called customers may participate in the calls by way of their corresponding customer devices 30. During the anonymous call, the generic user may use systems and methods described herein to perform tasks such as verifying the identity of the customer, leaving a message for the customer, playing a pre-recorded automated message, dispositioning the call, etc.

Another aspect of the invention provides human-assisted systems for verifying the identity of a customer over a call without displaying or revealing personal information about the customer to the human operator engaging in the call with the customer to assist with the identity verification process. In most call center call flows, it is necessary to first verify the identity of a customer before providing services to the customer.

Conventionally, identity verification involves checking that the customer knows information that would only be known to the customer. That information is typically confidential or personal information about the customer. In conventional call centers in which the human operator is given access to such confidential or personal information the human operator must generally be a trained agent who has been screened for security and reliability.

Aspects of the invention provide systems which prompt an operator to ask identity verification questions to a customer over a call made on an electronic device (e.g. remote electronic device 20), prompt the operator to input the customer's answers into the system through the same electronic device, and determine whether the customer is verified (e.g. whether the customer is who they purport to be) without displaying personal information about the customer on the electronic device or revealing personal information about the customer to the operator. Such systems may create and prompt the operator to ask a series of identity verification questions which are designed to evoke answers useful for verifying the identity of a customer but which do not reveal confidential or personal information to the operator. Such systems may also selectively connect the customer with an operator who is unlikely to have personal knowledge that could help them to guess confidential or personal information about the customer. For example:

- The questions may contain only fragments of pieces of personal information (e.g. a particular digit in a number such as the first or last digit in a day of the month, a zip code or an address);
- The questions may be based in part on or reference "fake information" (i.e. information which resembles personal information but is not factual);
- The questions may be phrased in a way which does not reveal personal or confidential information (such as "are any of the following numbers your street address");
- The system may be configured to connect a customer with an operator who is located far away from the customer and/or has no connection to the location of the customer.

Including fake information in the identity verification question helps reduce the likelihood of a generic user guessing the customer's personal information. This enables any generic user to engage in a call with a customer to ask the series of identity verification questions to assist the system in performing the identity verification process.

In some embodiments, the system subsequently calculates the odds of a customer correctly guessing the answers to the series of identity verification questions and determines whether the customer is verified based on the calculated odds. The system may be configured to disposition the call or, optionally, transfer the call to a more qualified agent after verifying the identity of the customer. Since systems which operate in this manner do not reveal personal or confidential information to the human operator who assists the system, the range of people who may be chosen to be the human operator is dramatically increased.

Systems and methods described herein may provide tools which assist the operator in asking the identity verification questions to the customer over remote electronic device 20. Systems and methods described herein may also include features which help improve the quality of a call between an untrained generic user and the customer. For example, system 10 may be configured to deliver scripts to remote electronic device 20 as the generic user is conversing with the customer. The generic user may converse with the customer based on the scripts delivered to electronic device 20. In some embodiments the scripts are dynamically varied by system 10 (or server 40). In some embodiments the scripts are dynamically varied based on inputted customer answers (e.g. answers inputted by the generic user, etc.). In some embodiments the scripts are dynamically varied in response to customer answers detected autonomously (e.g. by speech recognition). As another example, system 10 may be configured to transfer the call between a generic user and a customer to a trained agent working in a call center 5 (e.g. after the generic user has verified the identity of the customer).

Figure 2:
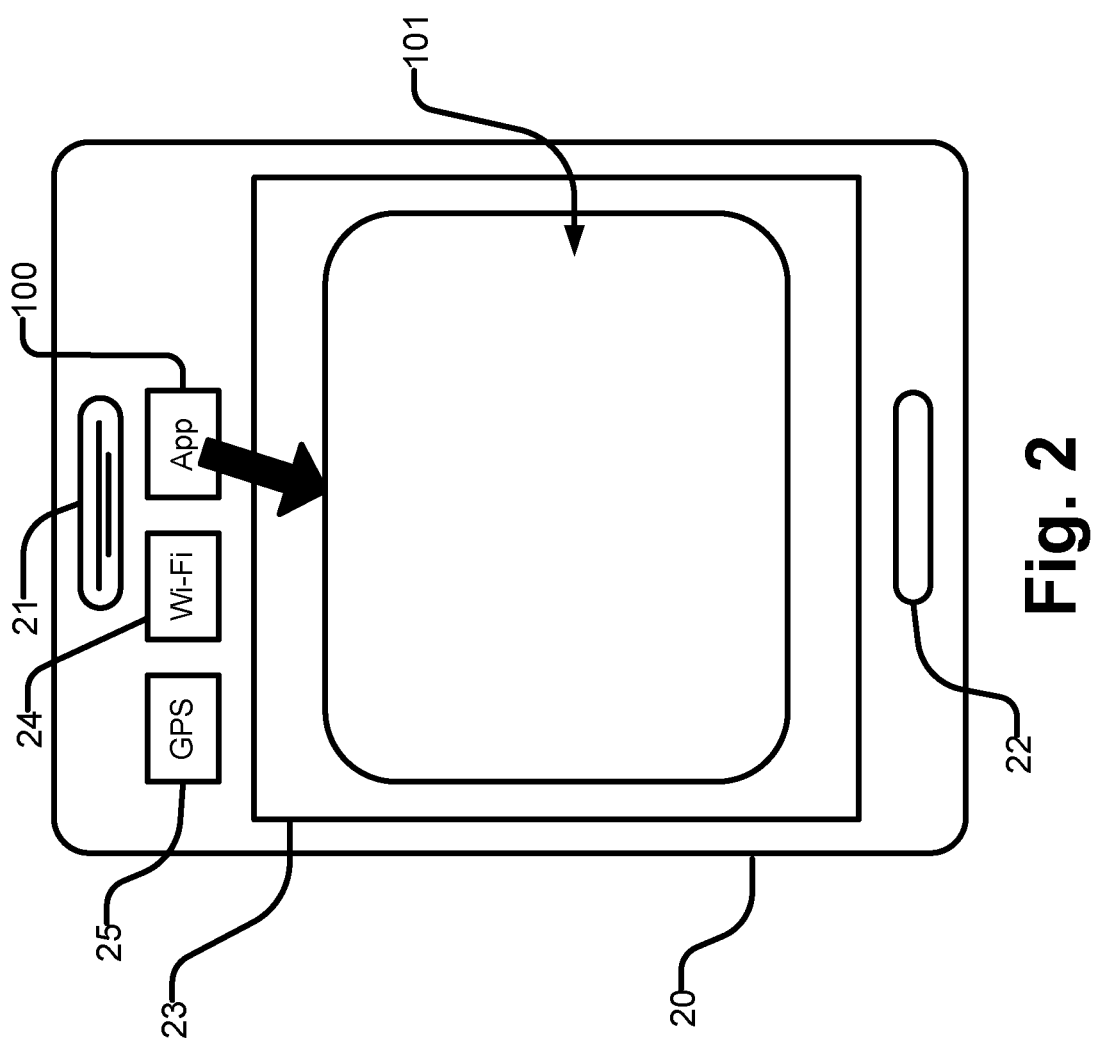
FIG. 2 shows an electronic device on which a mobile application is installed according to an example embodiment.

FIG. 2 shows an exemplary remote electronic device 20. Remote electronic device 20 comprises a speaker 21 for converting electric signals into sound, a microphone 22 for converting sound into an electric signal, a screen 23 for displaying information (e.g. data), a wireless connection 24 for transmitting and/or receiving information via the internet 15B, satellites, or the like, and, optionally, a Global Positioning System ("GPS") 25 for determining the device's geo-location. Remote electronic devices 20 are typically in two-way communication with system server 40 through network 15. That is, remote electronic devices 20 are typically configured (e.g. by installing a software application 100) to transmit data to and receive data from system server 40. Remote electronic devices 20 are typically mobile devices (e.g. smartphones, smartwatches, laptops, tablets, etc.) although this is not necessary. Remote electronic device 20 may be any electronic device that can communicate with system server 40 and enable a generic user to engage in a tele-conversation with a customer (through their customer device 30) over network 15.

Remote electronic device 20 comprises or otherwise accesses a software application 100. Software application 100 may be stored in the memory of the remote electronic device 20 and configured to be executed by a processor of the remote electronic device 20 to provide an interface for a generic user (e.g. untrained user) to perform call center tasks (e.g. call and verify the identity of a customer) over remote electronic device 20. In a currently preferred embodiment, software application 100, upon execution, provides a graphical user interface (GUI) 101 and displays GUI 101 on screen 23 of remote electronic device 20. A generic user may operate GUI 101 to transmit data to and/or receive data from system server 40.

Software application 100 may be configured to launch a GUI 101 having varying display configurations (e.g. resolution, screen dimensions, fonts, graphics, etc.) based on the type of remote electronic device 20 being used. For example, software application 100 may be configured to launch a GUI 101 comprising graphical elements which are larger, more detailed, or of higher resolution when software application 100 is installed on a laptop computer compared to when mobile application 100 is installed on a smartphone.

Figure 3:
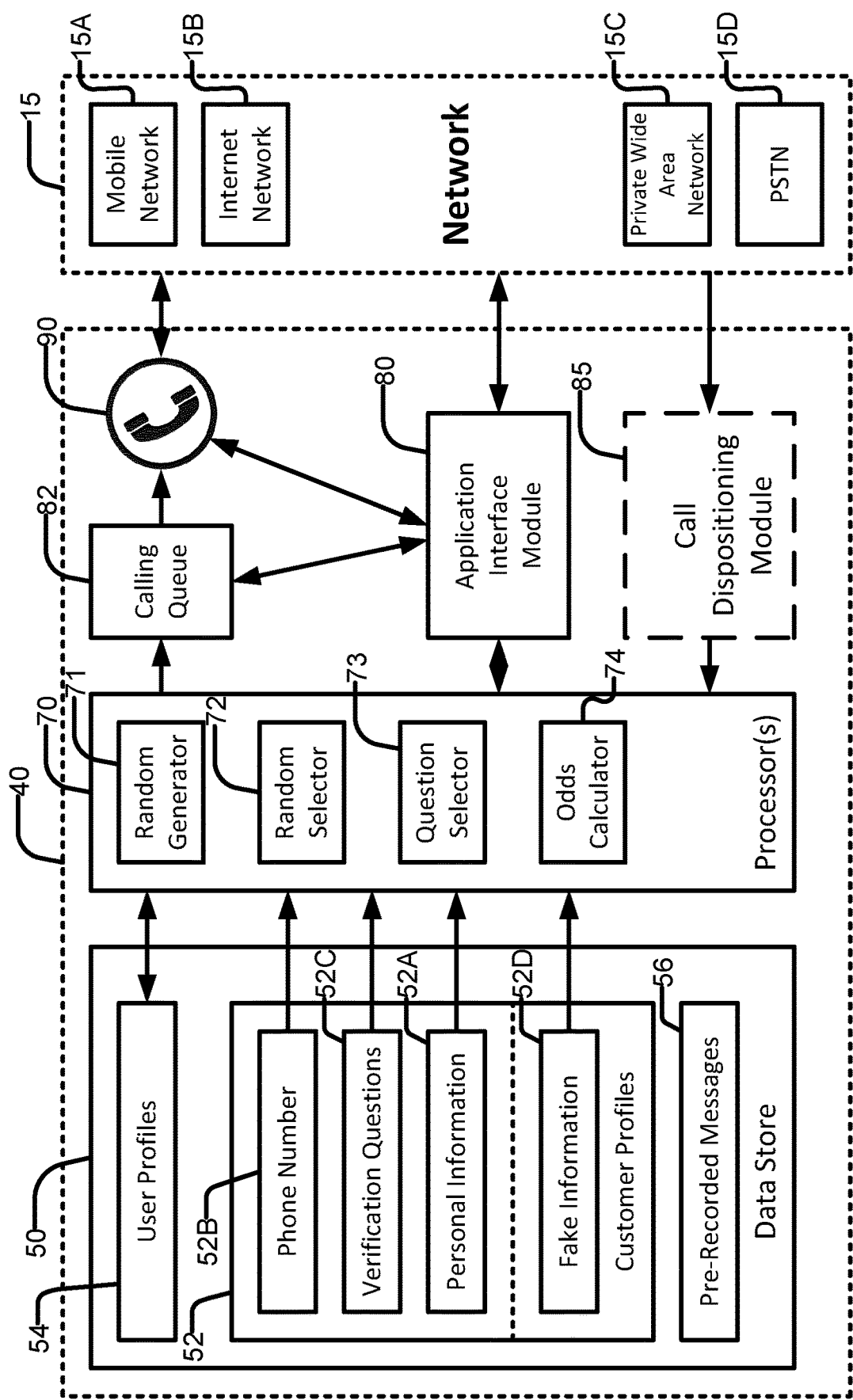
FIG. 3 is a block diagram illustrating a system server according to an embodiment.

FIG. 3 is a block diagram of an exemplary system server 40. While shown and described as a single system server 40, this is not necessary. System server 40 may include any number of servers and/or databases adapted to provide the necessary data management and server functions to support various features and functions of system 10 described herein. For example, system server 40 may comprise a suitable web server capable of receiving data from and transmitting data to one or more remote electronic devices 20 over a cellular data network, a satellite data network, a WiFi network, or the like.

System server 40 is in communication with one or more remote electronic devices 20 through network 15. System server 40 may transmit data to or receive data from remote electronic devices 20 during specific times in a call flow. For example, system server 40 may be configured to transmit customer profile 52 or portions of customer profile 52 to remote electronic device 20 prior to the user initiating a call as described in more detail elsewhere herein. As another example, system server 40 may be configured to transmit information, some of which are to be displayed on screen 23, only during the call and not before or after the call. For example, system server 40 may be configured to transmit identity verification questions 52D to remote electronic device 20 only after system server 40 receives indication (e.g. from the generic user's selections over GUI 101) that the customer is willing to engage in the identity verification process.

System server 40 may be in further communication with one or more third-party electronic devices 7. Third-party electronic devices 7 may be operated by specialized users (e.g. trained agents). Third-party electronic devices 7 may be provided in a physical call center 5 as illustrated in FIG. 1. Third-party electronic devices 7 comprise one or more of a speaker, a microphone, and a connection for transmitting and/or receiving information via the internet, satellites, a local area network (LAN), or the like. Like remote electronic devices 20, third-party electronic devices 7 are also typically in two-way communication with system server 40.

Preferably third-party electronic devices 7 are provided as part of an assembly of electronic devices which communicate with each other over Voice over Internet Protocol (VoIP).

In the example embodiment shown in FIG. 1, call center 5 includes a switch/media gateway 6 coupled to network 15 to receive customer calls (i.e. calls from a customer) which have been redirected to call center 5 by system server 40. Gateway 6 may be configured to function as a central switch for routing calls between various call center electronic devices 7 within call center 5. Gateway 6 may include one or more of a private branch exchange (PBX), an IP-based switch, an automatic call distributor, a switch configured to receive VoIP calls, and a switch configured to receive calls over a telephone network. In some embodiments, gateway 6 is coupled to an internal server which may function as an adapter or interface between gateway 6 and call center electronic devices 7 and/or other routing, monitoring, or call-handling systems of call center 5.

System server 40 comprises a data store 50, one or more processors 70, and an application interface module 80 which interfaces with software application 100 installed on remote electronic device 20. Application interface module 80 is configured to transmit data, including but not limited to information stored on data store 50, to remote electronic device 20 through network 15. Application interface module 80 is also configured to receive data, including but not limited to data corresponding to a selection made by a user of remote electronic device 20, from remote electronic devices 20. Application interface module 80 may be implemented using any suitable technology adapted to provide the necessary functions to allow system server 40 to communicate with remote electronic device 20. For example, application interface module 80 may comprise a series of application program interfaces (APIs) which are operable to move data between remote electronic device 20, data store 50 and/or an integrated dialing platform (i.e. a dialer) 90.

The integrated dialing platform 90 is operable to establish a voice or video connection between a remote electronic device 20 (through software application 100 and/or application interface module 80) and a customer device 30 through network 15. Dialing platform 90 may, for example, comprise any suitable third-party dialing platform adapted to provide the necessary functions to establish the voice or video connection between the remote electronic device 20 and the customer device 30. In some embodiments, dialing platform 90 is configured to connect with the remote electronic devices 20 over a first network and to connect with the customer devices 30 over a second network. In some embodiments, dialing platform 90 is configured to connect with the remote electronic devices 20 over a VoIP network 15B. In some embodiments, dialing platform 90 is configured to connect with customer devices 30 over a PSTN network 15D.

In some embodiments, dialing platform 90 comprises a call switchboard which allows a call between a remote electronic device 20 and a customer device 30 to be transferred to, for example, an operator working in a traditional call center 5. The call switchboard may be operated using suitable frameworks such as the WebRTC framework to establish a VoIP connection between call center 5 and dialing platform 90 after the call is transferred. System server 40 may optionally include features which allow calls made across dialing platform 90 to be monitored and/or recorded. Such features may, in some cases, be embodied as part of dialing platform 90.

Data store 50 is configured to store information (e.g. name, address, phone number, email, credit card number, social insurance number, bank account information, etc.). For example, data store 50 may be configured to store personal information of a customer and/or personal information of a generic user. In the example embodiment shown in FIG. 3, data store 50 is configured to store personal information of a customer as part of a customer profile 52 and personal information of a generic user as part of a user profile 54. Data store 50 may be configured to store a unique customer profile 52 for each unique customer and/or a unique user profile 54 for each unique user. Data store 50 may store a large number (e.g. up to millions or even billions) of customer profiles 52 and/or user profiles 54.

As shown in FIG. 3, each customer profile 52 typically includes, among other things, personal information 52A, a phone number 52B, one or more identity verification questions 52C, and fake information 52D. Personal information 52A and phone number 52B may be provided, for example, by a third party company looking to provide call center services or otherwise make call center services available to the customer. Upon or after receiving personal information 52A, system server 40 may be configured to create fake information 52D which resembles personal information 52A. For example, personal information 52A may comprise the address of the customer and system server 40 may generate a fake address which looks like the real address of the customer. Fake information 52D is generated by system server 40 for the purposes of creating identity verification questions 52C which include fake information 52D. By mixing real personal information 52A and fake information 52D together to create an identity verification question 52C, system server 40 and/or software application 100 can present the identity verification question 52C to a generic user without risking the generic user becoming knowledgeable about personal information 52A of the customer.

In some embodiments, system server 40 is configured to automatically create customer profile 52 upon receiving personal information 52A and/or phone number 52B. In other embodiments, customer profile 52 is created by an administrator of system server 40 based on the needs of the third-party company.

Personal information 52A typically includes fields for the name of the customer and other suitable account-related information (e.g. address of the customer, birthday of the customer, credit card number, social insurance number, etc.). The fields are populated by corresponding values (e.g. a string, an integer, a float, etc.). Personal information 52A may include fields which are customized based on the type of service which needs to be provided for customer profile 52. For example, where a customer of customer profile 52 owes debt, personal information 52A may include fields such as the amount of money owed, the amount of interest accrued, the due date of the debt owed, etc. As another example, where a customer of customer profile 52 is a subscriber to an internet service provider, personal information 52A may include fields such as the current service plan for the customer, the amount of bandwidth available, credit card number, address for the service location, etc.

As described above, identity verification questions 52C include questions which are useful for verifying the identity of the customer associated with customer profile 52. Identity verification questions 52C are typically generated by a processor 70 of system server 40 based on the fields of personal information 52A. For example, personal information 52A may include a "birthday" field and identity verification questions 52C may include corresponding question (s) related to the customer's birthday. As another example, personal information 52A may include an "address" field and identity verification questions 52C may include corresponding question(s) related to the customer's address.

An aspect of the invention relates to systems and methods for generating identity verification questions 52C which are suitable for presentation or display on a remote electronic device 20. Since software application 100 (installed on remote electronic devices 20) is intended to be operated by generic users (e.g. members of the general public), identity verification questions 52C (and their corresponding answer options) are preferably phrased in a way that prevents the generic user from obtaining confidential personal information as they assist in the identity verification process through their remote electronic devices 20. For example, system server 40 may generate identity verification questions 52C based on fragments or sub-field(s) of a field of personal information 52A as described in more detail below.

Figure 3A:
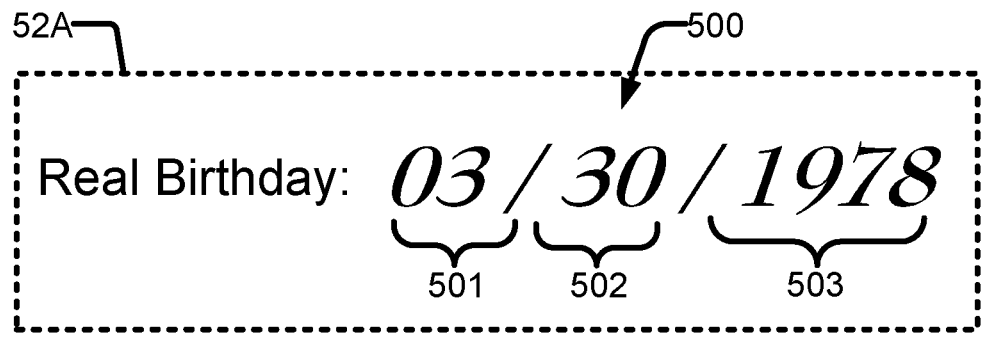
FIG. 3A depicts an exemplary field of personal information stored on a data store of the FIG. 3 system server.

FIG. 3A depicts an exemplary field 500 of personal information 52A stored on data store 50 of system server 40. Field 500 stores the birthday of the customer. Field 500 comprises a month sub-field 501, a day sub-field 502, and a year sub-field 503. In a currently preferred embodiment, a processor 70 of system server 40 is configured to create identity verification questions 52C based on the sub-fields 501, 502, 503 of personal information 52A. For example, processor 70 may be configured to create a first identity verification question 52C-1 based on the month-sub field 501 (e.g. "Is the month of your birthday April, August, September or December?"), a second identity verification question 52C-2 based on the day sub-field 502 (e.g. "What is the last digit of the day of your birth?") and/or a third identity verification question 52C-3 based on the year-sub field 501 (e.g. "What is the last digit of your year of birth?").

As illustrated by the example described above, processor 70 may be configured to combine real information 52A (e.g. "April") with one or more pieces of fake information 52D (e.g. "August", "September" and "December") and transmit the combined information to remote electronic device 20 for display on GUI 101 but not for selection on GUI 101 (i.e. real information 52A and fake information 52D may be presented as part of the identity verification question 52C displayed on GUI 101 but are not selectable as answers). Alternatively, processor 70 may be configured to transmit real information 52A and fake information 52D to remote electronic device 20 for both display and selection on GUI 101 (i.e. real information 52A and fake information 52D may be presented as selectable answer options to identity verification question 52C).

Preferably system server 40, in the example above, is configured to transmit only one of the first, second and third identity verification questions 52C-1, 52C-2, 52-3 to remote electronic device 20 in any single instance of the identity verification process. That is, system server 40 is preferably configured to transmit (and remote electronic device 20 is preferably configured to display) a series of identity verification questions 52C, each of which relate to a different field (not just a different sub-field) of personal information 52A, in any single instance of the identity verification process. This reduces the risk of the generic user piecing together the customer's personal information based on information gathered from different sub-fields of the same field.

Identity verification questions 52C may be generated offline (i.e. before the call between a generic user of remote electronic device 20 and customer of customer device 30) although this is not necessary. Identity verification questions 52C may be generated in real-time in some cases.

A further level of protection for personal information may be provided by instructing the customer to provide wrong answers to some questions. For example, the customer may be instructed "You will be asked four [or some other number of] questions. Please provide a wrong answer to exactly one [or some other number] of these questions." The generic user will not know which answers are correct and which answers are wrong. System 10 may take the number of correct and wrong answers as a factor in verifying the identity of the customer.

Figure 3B:
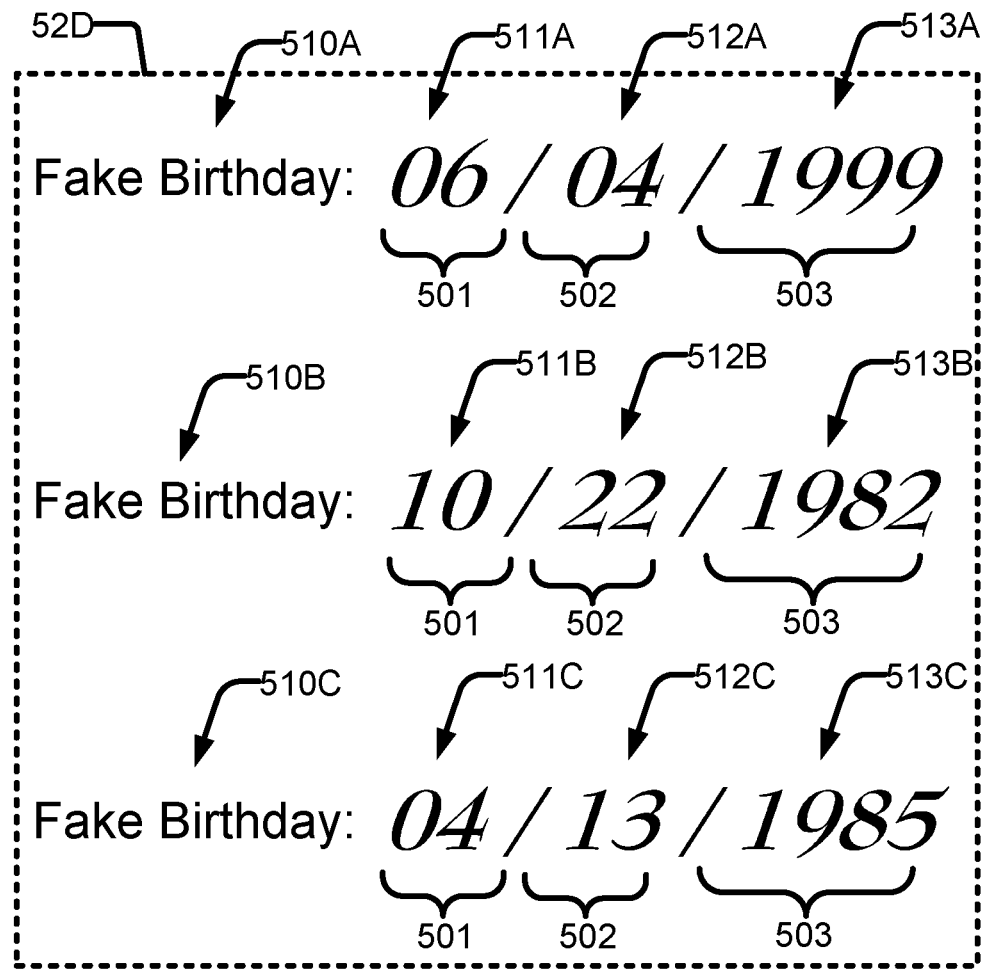
FIG. 3B depicts exemplary fake information stored on a data store of the FIG. 3 system server.

Another aspect of the invention relates to systems and methods for generating fake information 52D based on personal information 52A and subsequently presenting or displaying fake information 52D together with real personal information 52A on remote electronic device 20 to help facilitate a customer verification process. FIG. 3B depicts a set of exemplary fake information 52D stored on a data store 50 of system server 40. The set comprises three pieces of fake information 510A, 510B, 510C, each of which comprises sub-fields corresponding to those of real personal information 52A for field 500. Each sub-field is populated by a corresponding value. As depicted in FIG. 3B, each piece of fake information 510 comprises a month value 511 for the month field 501, a day value 512 for the day field 502, and a year value 513 for the year field 503. Like identity verification questions 52C, fake information 52D may be generated offline and stored in data store 70 although this is not necessary.

In some embodiments, fake information 52D is generated by a random generator 71 of processor 70. In other embodiments, fake information is generated manually (e.g. by an administrator of system server 40) and/or with a computer algorithm which may include random variables. In some embodiments, a piece of fake information 52D comprises segments which are generated by random generator 71 and segments which are generated manually and/or with an algorithm and certain rules. For example, referring to FIGS. 3A-3B, each piece of fake information 510 may comprise a month value 511 which is generated randomly (i.e. a random number selected between 1 and 12), a day value 512 which is generated randomly (i.e. a random number selected between 1 and 30), and a year value 513 which is generated based on certain rules to create an authentic-looking value. For example, the year value 513 may be generated based on a rule which specifies that the random number must be selected between plus or minus 10 of the value of the year field 503 of real personal information 52A (i.e. the fake birthday year is between plus or minus 10 years of the real birthday). The rule may, for example, further specify an age restriction which prohibits the generation of fake year values 513 which correspond to an unreasonably young or unreasonably old age.

In some embodiments, fake information 52D is generated by a random selector 72 which randomly selects a piece of fake information from a database. The database may be an external database or a database provided as part of system server 40 (e.g. the database may be a part of data store 50). For example, personal information 52A may comprise an address field (which may include information such as street name, street number, unit number, city, country, postal code, etc.) and fake information 52D may comprise corresponding fake addresses which are randomly selected from a database by random selector 72. The fake addresses may be selected based on certain rules to generate an authentic-looking fake address. For example, the fake addresses may be selected randomly from a list of authentic addresses which are in the same country as the country of the real address, in the same city as the city of the real address, on the same street as the street of the real address, and/or in the same postal region (e.g. having the same postal code) as the postal region of the real address.

Figure 3D:
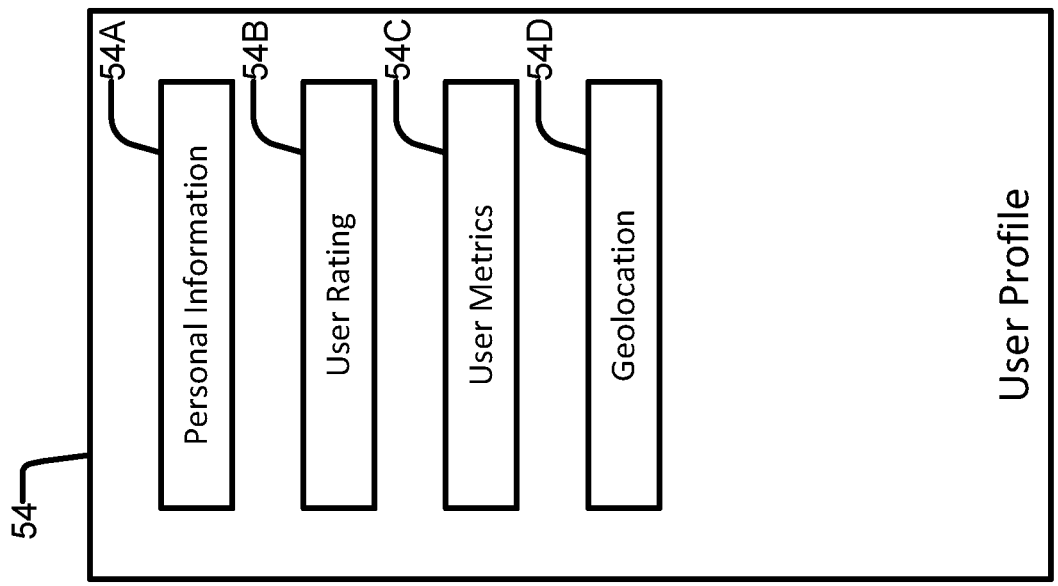
FIG. 3D depicts an exemplary user profile stored on a data store of the FIG. 3 system server.
Figure 3C:
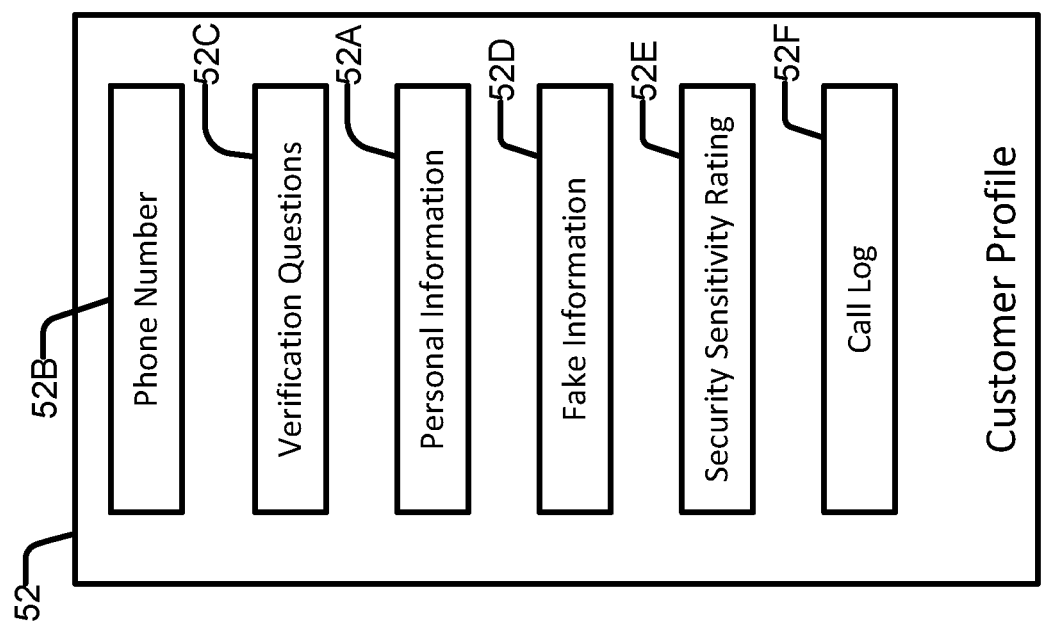
FIG. 3C depicts an exemplary customer profile stored on a data store of the FIG. 3 system server.

Data store 50 is also configured to store user profiles 54. As shown in FIG. 3D, each user profile 54 may include, among other things, personal information 54A, a user rating 54B, user metrics 54C, and, optionally, the geolocation 54D of the user of user profile 54. Personal information 54A may be provided, for example, by the generic user upon setting up a user account as described in more detail below. Examples of personal information 54A include, but are not limited to, the name of the user, the age of the user, the languages spoken by the user, etc.

User rating 54B may be created upon the user setting up their user account. User rating 54B may be updated as the user uses software application 100 to engage in calls with customers. User rating 54B may be updated in real-time. For example, a user's user rating 54B may increase each time system server 40 successfully transfers a call between the user and a customer to a more qualified call center agent, each time the user successfully verifies the identity of the customer, etc. Conversely, a user's user rating 54B may decrease each time a customer hangs up abruptly on the user, each time the user spends more than a certain amount of time performing a certain task, etc. In some embodiments, system server 40 is configured to prioritize connecting customers with users that have relatively high user ratings 54B over connecting customers with users that have relatively low user ratings 54B.

In some embodiments, system server 40 is configured to collect or otherwise generate metrics 54C which measure the performance of a remote call center agent operating remote electronic device 20. The metrics 54C may be stored in data store 50 as part of user profile 54 as shown in FIG. 3D. Examples of metrics 54C include, but are not limited to, the average amount of time it takes for the user to complete a call, the user's rate of successfully transferring a call, the total amount of time spent by the user using software application 100, etc. In some embodiments, system server 40 is configured to consider or otherwise incorporate metrics 54C into user rating 54B. That is, user rating 54B may be adjusted (i.e. increased or decreased) dynamically based on metrics 54C.

In some embodiments, system server 40 is configured to receive (and remote electronic device 20 is configured to transmit) the geolocation 54D of remote electronic device 20. As described above, remote electronic device 20 may comprise a GPS 25 for determining the device's physical location. GPS 25 may determine the device's physical location each time a user logs in to its user account on remote electronic device 20. GPS 25 may transmit data corresponding to the geolocation of remote electronic device 20 to system server 40. The geolocation 54D may be stored on data store 50 as part of user profile 54.

In operation, phone numbers 52B of customer profiles 52 are placed in one or more calling queues 82 which establish one or more lists of phone numbers 52B which may be called by a user of remote electronic device 20. When a user of remote electronic device 20 initiates an anonymous phone call through system 10 (e.g. by pressing a button on GUI 101), software application 100 establishes a voice or video connection with dialing platform 90 over network 15 and system server 40 instructs dialing platform 90 to call a number from calling queue 82. In some embodiments, calling queue 82 comprises an ordered list and system server 40 is configured to instruct dialing platform 90 to dial the next number from calling queue 82 upon a generic user initiating a call over software application 100. In some embodiments, system server 40 comprises multiple calling queues 82 and system server 40 is configured to instruct dialing platform 90 to dial only certain numbers from certain calling queues 82 as described in more detail below.

One aspect of the invention relates to systems and methods for selectively connecting a user of remote electronic device 20 with a customer. That is, one aspect of the invention provides systems and methods for connecting certain users of remote electronic device 20 with only certain customers. For example, certain users may be selected to connect with certain customers based on information stored in customer profile 52 and/or user profile 54.

In some embodiments, users with higher user ratings 54B are assigned by system server 40 to call the more difficult customers (e.g. customers who are harder to reach, customers who have previously hung up on a call, customers who are less likely to cooperate due to the nature of the task involved, etc.). For example, the more difficult customers may be grouped in a specific calling queue 82 and system server 40 may be configured to instruct dialing platform 90 to dial a number 52B from the specific calling queue 82 when a high-rated user (i.e. a user with a high user rating 54B) initiates a call.

In some embodiments, user profile 54 includes information about the language proficiency of the associated user (e.g. as part of personal information 54A) and system server 40 may be configured to instruct dialing platform 90 to dial certain numbers 52B from certain calling queues 82 based on the language proficiency of the user. For example, system server 40 may comprise different calling queues 82 for different languages spoken by the customers. In this example, dialing platform 90 may receive instructions from system server 40 to dial a number from an English speaking calling queue 82 when a user who is proficient in English initiates a call.

Preferably system server 40 is configured to connect generic users and customers in a selective manner and/or a manner which reduces the likelihood of the generic user becoming aware of or otherwise guessing the customer's personal information.

For example, system server 40 may be configured to assess the geolocation 54D of a user and connect the user with a customer that is located at a geolocation which is far away from the geolocation 54D of the user. System server 40 may determine or otherwise estimate the geolocation of the customer based on, for example, the area code of phone number 52B. In some embodiments, system server 40 is configured to look up the area code corresponding to the geolocation 54D of the user and instruct dialing platform 90 to dial only numbers 52B which do not have the same area code as the area code of the user. By ensuring that the generic users engage only in calls with customers who are located outside of their area code, the likelihood of connecting a customer with a generic user who is familiar with the customer is greatly reduced.

When a voice connection is established between a remote electronic device 20 and a customer device 30 through dialing platform 90, application interface module 80 is configured to deliver data concurrently to remote electronic device 20 through network 15. The data includes voice data as well as data which may be displayed through GUI 101 on screen 23 of remote electronic device 20. A user of remote electronic device 20 may interact with GUI 101 to transmit data back to application interface module 80 through network 15 as the user is engaging in a voice call with a customer over dialing platform 90. For example, a user of remote electronic device 20 may ask identity verification questions 52C to the customer and thereafter select buttons displayed on GUI 101 to transmit data corresponding to the customer's answers to application interface module 80. As another example, a user of remote electronic device 20 may input text through GUI 101 to disposition a call and the text may be transmitted to an optional call dispositioning module 85 of system server 40. Further aspects of the invention are described herein with reference to an exemplary call flow described below.

Example Call Flow

Figure 4:
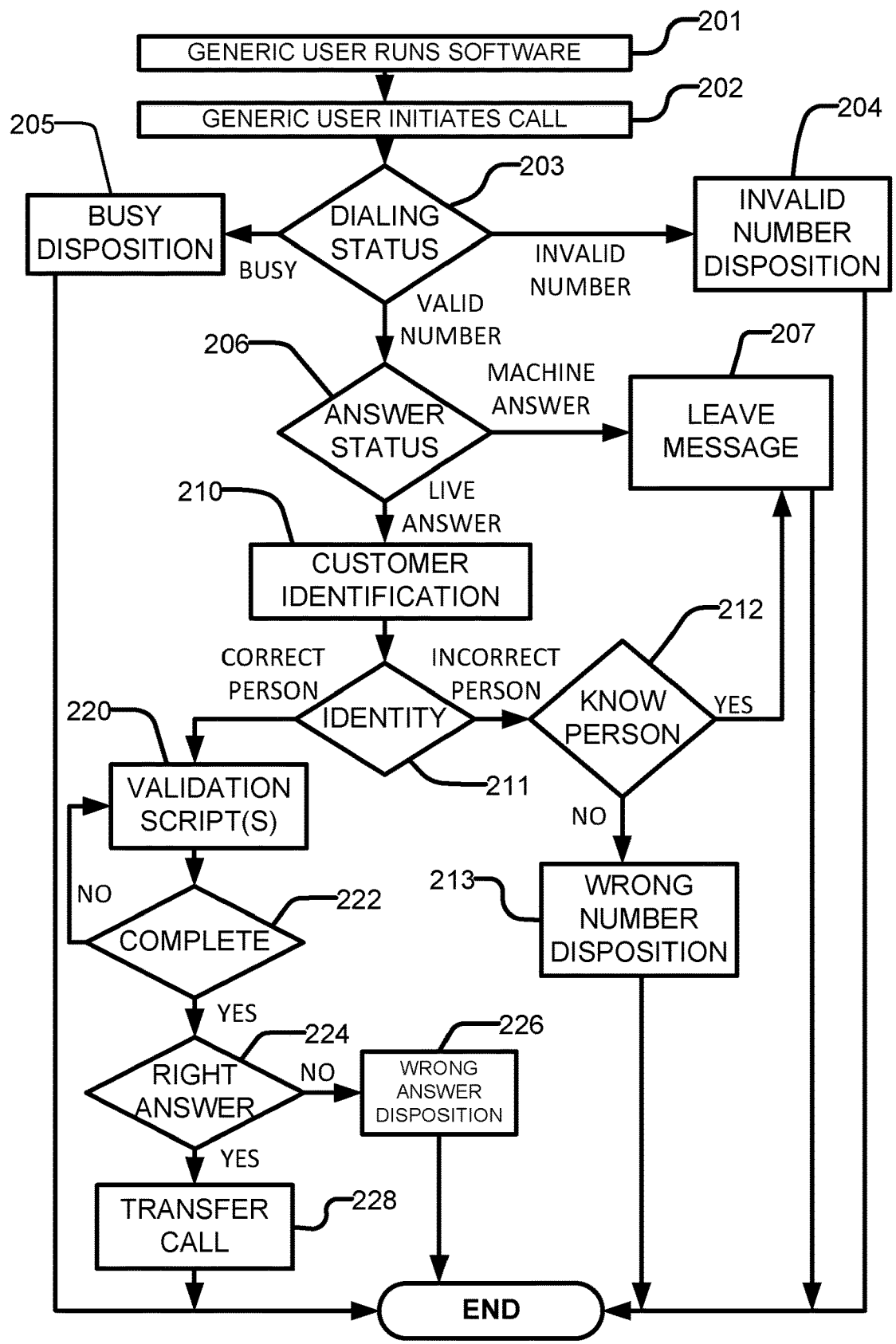
FIG. 4 is a flowchart illustrating an operation to connect a customer with a verified call center agent according to an example embodiment.

FIG. 4 is a flowchart illustrating an example call flow between a generic user operating remote electronic device 20 and a customer operating customer device 30. At block 201, a generic user launches software application 100 installed on remote electronic device 20. Upon launching software application 100, the generic user may be prompted (e.g. via GUI 101 displayed on screen 23 of remote electronic device 20) to set up a user account, provide login information or continue as a guest.

To set up a user account, the generic user may be required to provide personal information (e.g. one or more of first name, last name, physical address, email address, password, telephone number, age, occupation, etc.) to system server 40 through mobile application 100. In some embodiments, the generic user can create a user account by using one or more of the generic user's social media accounts (e.g. Facebook™, Gmail™, etc.). In some embodiments, setting up a user account may require the generic user to verify their personal information. For example, system server 40 may be configured to send a confirmation email to the user's email address to verify the user's email, or to send a confirmation text to the user's telephone number to verify the user's telephone number. In some embodiments, setting up a user account may require the user to verify their personal information by taking a photo of an identity document (ID) of the user (e.g. using a camera of remote electronic device 20) and sending the photo (e.g. through mobile application 100) to system server 40.

In some embodiments, system 10 is designed to provide a tiered user account system. That is, system 10 may be designed to classify its users (i.e. users who operate remote electronic device 20) into different tiers based on, for example, their personal information, how well their personal information has been verified and/or their ratings in a feedback system (e.g. user rating 54B) as described in more detail elsewhere herein. In the illustrative example discussed above, a user who has verified their personal information by sending a photo of their ID to system server 40 may be classified into a higher tier (i.e. may have access to a higher tiered account) than a user who has verified only their email or phone number. Similarly, a user who has verified their email or phone number may be classified into a higher tier than a guest user (i.e. a user who does not log in and continues as a guest upon launching software application 100).

Users who have access to higher tiered accounts may, for example, have access to more features provided in software application 100, have access to more data stored in system server 40, have access to more rewards, be compensated at a higher rate as described in more detail elsewhere herein, etc. Since users of remote electronic devices 20 may be presented with confidential information or fragments of confidential information to perform certain tasks (e.g. verify the identity of a customer), providing a tiered account system advantageously allows system server 40 to present such information to only select users. That is, only certain users (e.g. higher tiered users who have their identities verified) may be selected by system server 40 to engage in the more security sensitive calls.

In some embodiments, system server 40 comprises multiple calling queues 82 and the phone number 52B of different customer profiles 52 may be placed in different calling queues 82 based on a security sensitivity rating 52E of customer profile 52. For example, system server 40 may comprise a first calling queue for customer profiles 52 which have relatively high security sensitivity rating 52E and a second calling queue for customer profiles 52 which have relatively low security sensitivity rating 52E. In this example, system server 40 may grant users with access to first or second calling queues based on the user rating 54B of user profile 54. Users with relatively higher user rating 54B may engage in calls with phone numbers 52B from the first calling queue while users with relatively lower user rating 54B may engage in calls with phone numbers 52B from the second calling queue.

To log in to a user account, the generic user may be prompted by software application 100 to provide login information (e.g. an email address and/or a password associated with the user's account). Upon providing valid login information, software application 100 may retrieve user profile 54 from system server 40. Software application 100 is typically configured to provide functionalities and/or display corresponding graphical elements on screen 23 through GUI 101 based on the retrieved profile user profile.

Figure 4C:
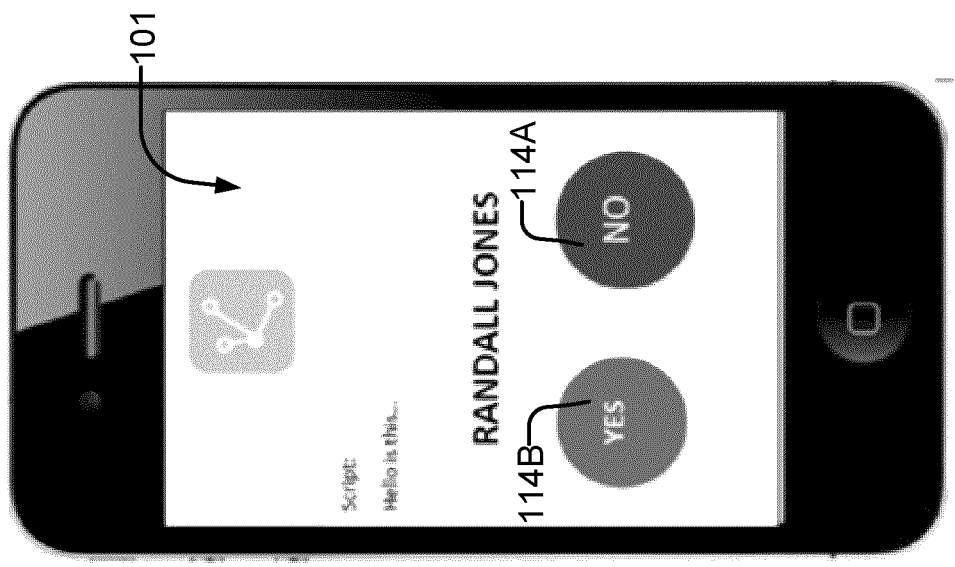
FIGS. 4A-I show various exemplary screenshots of a graphical user interface (GUI) of an application provided on the FIG. 2 electronic device.
Figure 4B:
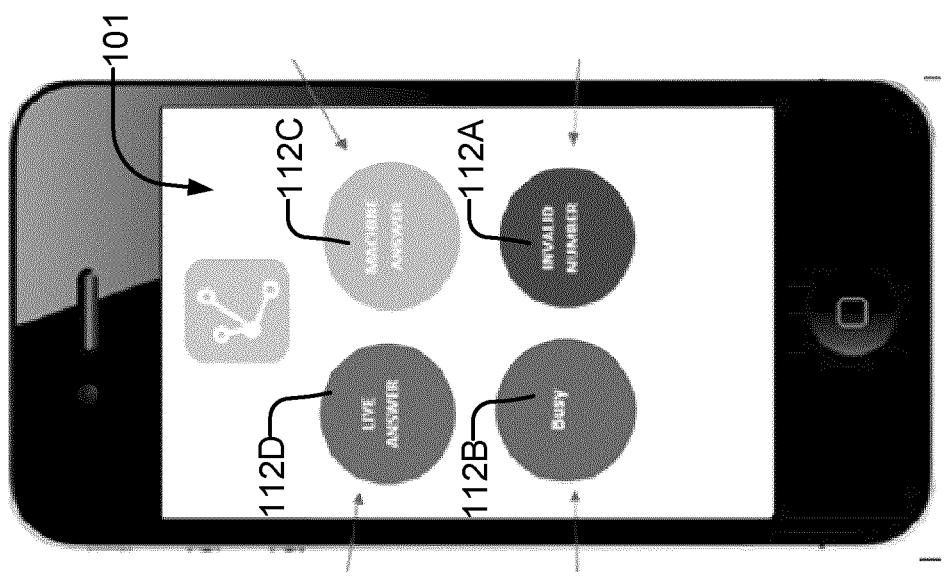
Figure 4A:
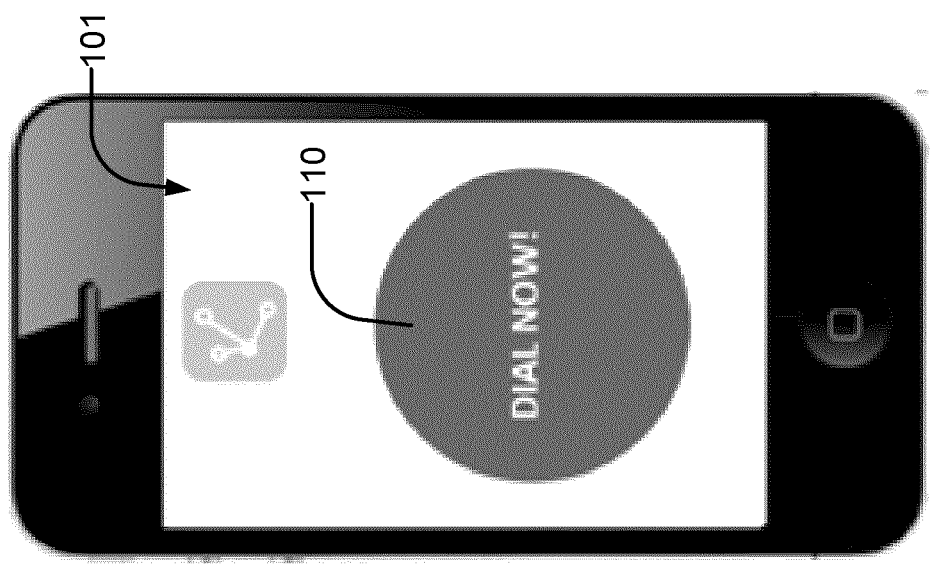

After logging into their user account (or continuing as a guest), the generic user may be provided with options to receive anonymous calls from customers and/or initiate anonymous calls with customers. In the example shown in FIG. 4, the generic user initiates an anonymous call in block 202 after logging in to their user account in block 201. To initiate an anonymous call, software application 100 may prompt the generic user to select or click a "dialing" button (or the like) displayed on GUI 101. FIG. 4A shows a screenshot of an example GUI 101 of mobile application 100 displaying a dialing button 110 to prompt the user to initiate an anonymous call with a customer. In the example shown in FIG. 4A, GUI 101 displays only the dialing button 110 (and not the phone number 52B of the customer) on screen 23. Designing GUI 101 to display dialing button 110 in this manner advantageously hides the customer's number from the generic user to thereby prevent the generic user from knowing the customer's number.

Upon the selection of dialing button 110 by the user, software application 100 initiates a call between the user of remote electronic device 20 and a customer through their customer device 30. Such a call may be initiated by several methods. In one exemplary method, software application 100 retrieves a customer phone number, which may be provided as part of a customer profile 52, from system server 40 and instructs a dialer platform of remote electronic device 20 to dial the customer phone number. As described elsewhere herein, software application 100 may be configured to store the customer phone number only temporarily (e.g in a cache) on remote electronic device 20. That is, software application 100 may be configured to automatically delete the customer phone number from remote electronic device 20 upon completion of the call. In a currently preferred exemplary method, software application 100 connects to system server 40 upon the generic user selecting the dialing button 110 and instructs system server 40 to dial the customer phone number (e.g. the next phone number in calling queue 82) through dialing platform 90. In this exemplary method, the call between the user of remote electronic device 20 and the customer is connected through system server 40.

After initiating the anonymous call in block 202, the call flow proceeds to decision block 203. At decision block 203, software application 100 may prompt the user of remote electronic device 20 to indicate the dialing status of the call by displaying a plurality of dialing status buttons 112 on GUI 101. FIG. 4B shows a screenshot of an example GUI 101 of mobile application 100 displaying four dialing status buttons 112 which may be selected by the user to indicate whether the number dialed in block 202 is invalid (i.e. not a number), valid but busy (i.e. no answer), or valid and answered. For example, the user of remote electronic device 20 may select the invalid number button 112A if the number called in block 202 is invalid.

In alternative embodiments, software application 100 and/or server 40 may be configured to automatically detect whether the number dialed in block 202 is invalid, valid but busy, or valid and answered.

If the number dialed in block 202 is invalid, the call flow proceeds to block 204 where the invalid number is dispositioned. Block 204 may comprise dispositioning the invalid number by indicating that the number is invalid in a call log 52F of customer profile 52 and removing customer profile 52 from calling queue 82. In some embodiments, dispositioning the invalid call comprises transmitting data from remote electronic device 20 to a call dispositioning module 85 of system 40. The call flow ends after dispositioning the invalid number in block 204.

If the number dialed in block 202 is valid but busy, the call flow proceeds to block 205 where the busy number is dispositioned. Block 205 may comprise dispositioning the busy number by transmitting data which indicates that the number is busy from remote electronic device 20 to call dispositioning module 85. Block 205 may comprise modifying call log 52F to indicate that the number is busy in customer profile 52. Block 205 may also comprise shuffling the dialed phone number 52B of customer profile 52 back into calling queue 82.

In some embodiments, dispositioning a busy number in block 205 comprises creating or otherwise maintaining a counter which keeps track of the number of times a call to the customer of customer profile 52 is unanswered. The counter may be stored as part of the customer profile 52 in data store 50. In some embodiments, the shuffling of the customer profile 52 back into the calling queue of system server 40 is performed based on the value of the counter (i.e. the number of times a call to the customer of customer profile 52 is unanswered). For example, the more times a call to the customer of customer profile 52 is left unanswered, the further the customer profile 52 may be shuffled back in calling queue 82. The call flow ends upon dispositioning the busy number in block 205.

If the number dialed in block 202 is valid and answered, the call flow proceeds to decision block 206. At decision block 206, software application 100 may prompt the user of remote electronic device 20 to indicate the call is answered by a machine or a person through GUI 101 (e.g. by displaying buttons 112). As shown in FIG. 4B, a user of remote electronic device 20 may be prompted by software application 100 to select either the "machine answer" button 112C if the call is answered by a machine or the "live answer" button 112D if the call is answered by a person. Alternatively, software application 100 and/or server 40 may be configured to automatically detect and determine whether the call is answered by a machine or whether the call is answered by a person.

If the call is answered by a machine (e.g. voicemail) in block 206, the call flow proceeds to block 207. Block 207 comprises leaving a message for the customer. In some embodiments, software application 100 and/or system server 40 is configured to leave an automated message if the call is answered by a machine. For example, system server 40 may store pre-recorded messages 56 in data store 50 and receive instructions from remote electronic device 20 to deliver a suitable pre-recorded message 56 to voicemail through dialing platform 90. In other embodiments, software application 100 prompts the user of remote electronic device 20 to leave a message (e.g. a voice recording, a text message, etc.) for the customer. The message may be transmitted from remote electronic device 20 to application interface module 80 to the customer through dialing platform 90. Where software application 100 and/or system server 40 prompts the user to leave a message for the customer, software application 100 may display text for the user to read (e.g. a script) on GUI 101.

If the call is answered by a person in block 206, the call flow proceeds to a customer identification step in block 210. Block 210 comprises identifying the customer. FIG. 4C shows a screenshot of an example GUI 101 of mobile application 100 displaying the name of the customer and prompting the user of remote electronic device 20 to ask whether the person on the line (i.e. the answerer) is the customer displayed on GUI 101. Upon the answerer answering the question, the call flow proceeds to decision block 211 where software application 100 prompts the user of remote electronic device 20 to indicate whether the answerer has identified herself as the customer. Software application 100 may prompt the user to indicate whether the person answering the phone call has identified herself as the customer by providing a selectable "NO" identification button 114A and a selectable "YES" identification button 114B on GUI 101 as shown in FIG. 4C.

If the "NO" identification button 114A is selected in block 211, the call flow may optionally proceed to a further decision block 212 before the call is dispositioned. Block 212 comprises determining whether the person answering the phone knows or is acquainted with the customer. If the answerer knows or is acquainted with the customer, the call flow proceeds to block 207 where software application 100 prompts the user to leave a message for the customer. In some embodiments, software application 100 prompts the user to leave a message for the customer by displaying text for the user to read out to the answerer. In some embodiments, software application 100 prompts the user to leave a message for the customer by playing a pre-recorded message 56. Block 207 may optionally comprise shuffling customer profile 52 back into the calling queue 82 of system 40. If the answerer does not know the customer, the call flow proceeds to block 213 where the wrong number is dispositioned. Block 213 may comprise dispositioning the wrong number by indicating that the number is wrong in call log 52F of customer profile 52 and removing customer profile 52 from calling queue 82. The call flow ends after dispositioning the wrong number in block 213.

While the call flow may proceed to decision block 212 after the "NO" identification button 114A is selected, this is not necessary. In some cases, call flow proceeds directly to block 213 to disposition the wrong number immediately after the "NO" identification button 114A is selected.

Figures 4D, 4E, 4F:
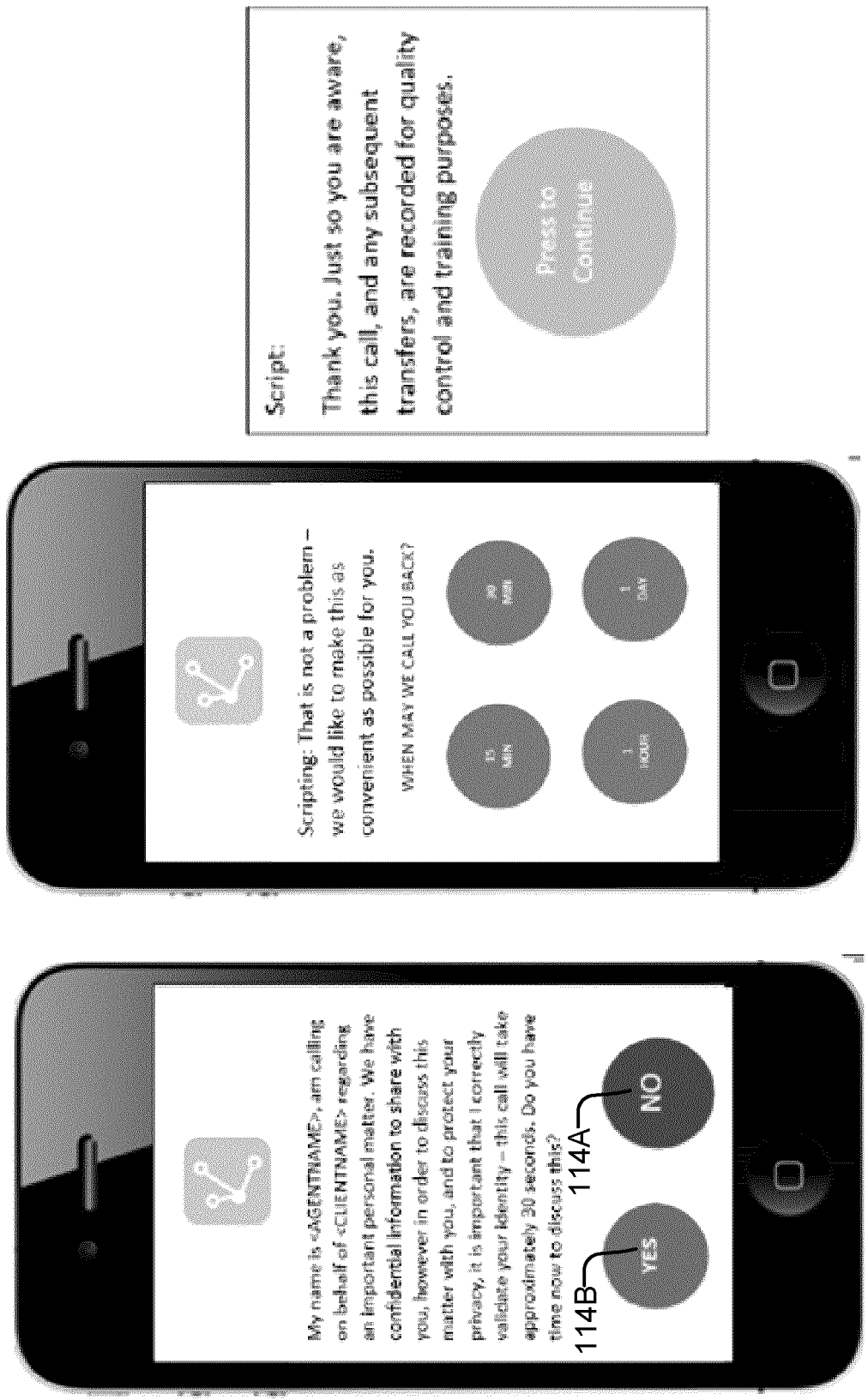

If the "YES" identification button 114B is selected in block 211, the call flow proceeds to an identity verification step in block 220. Block 212 comprises verifying whether the answerer is the customer. FIGS. 4D-F show screenshots of an example GUI 101 of mobile application 100 displaying texts which prompt the user of remote electronic device 20 to ask whether the answerer is prepared to verify their identity in block 220. As shown in FIG. 4D, block 220 may comprise prompting the user to ask the answerer whether they have time to answer a sequence of identity verification questions 52C. If the answerer indicates that they do not have time to verify their identity, block 220 may comprise dispositioning the call by shuffling customer profile 52 back into calling queue 82. Customer profile 52 may be shuffled back into calling queue 82 based on a convenient callback time provided by the answerer. For example, customer profile 52 may be shuffled close to the front of the calling queue if the answerer indicates that they prefer to be called back in a short period of time.

Figure 4H:
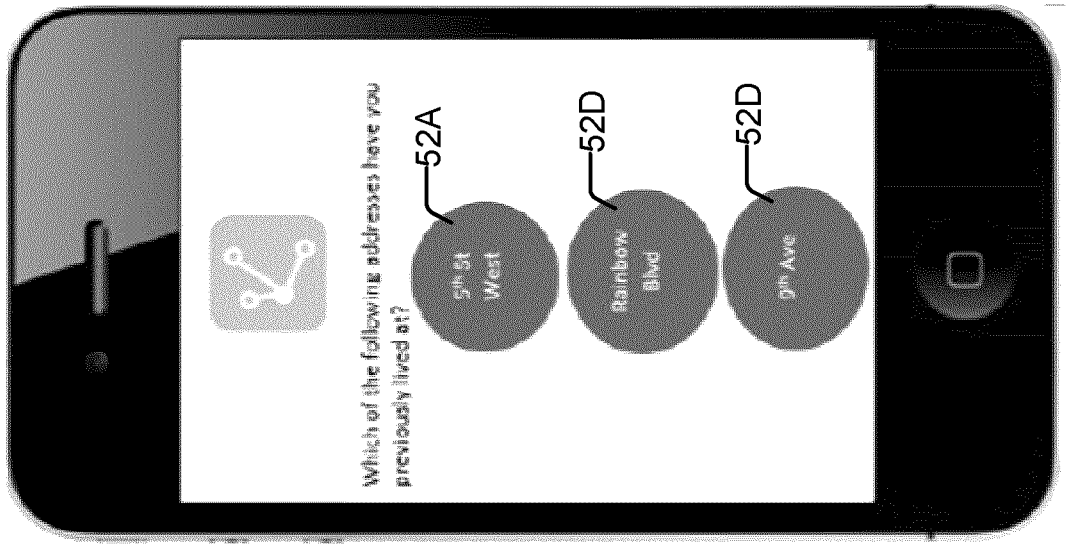
Figure 4G:
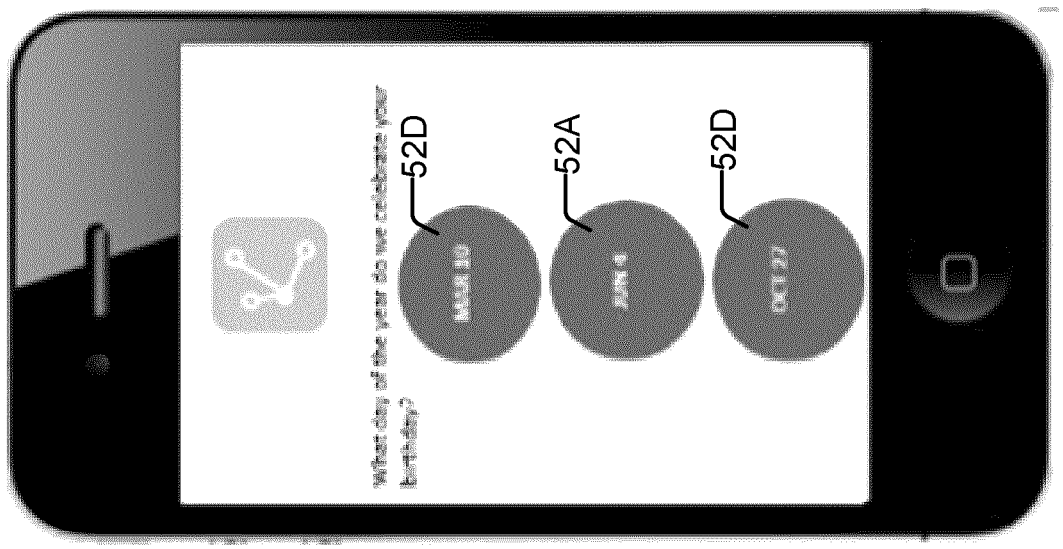
Figure 4I:
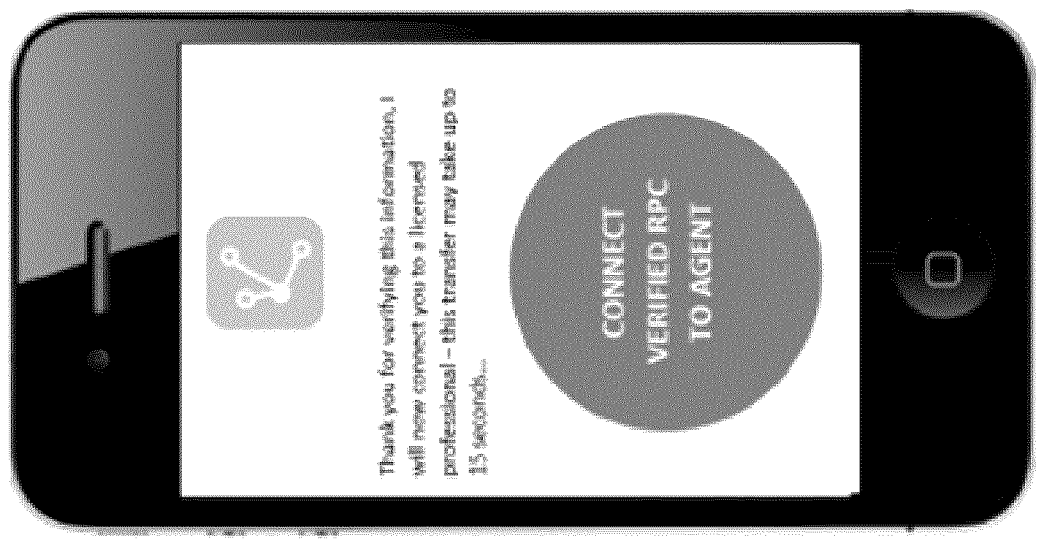

If the answerer indicates that they do have the time to verify their identity, block 220 comprises prompting the user to ask an identity verification question 52C to the answerer. FIGS. 4G-H show screenshots of GUI 101 displaying exemplary identity verification questions 52C. The identity verification questions 52C may be selected from data store 50 by a question selector 73 of system server 40. As described in more detail elsewhere herein, question selector 73 may be configured to select a series of identity verification questions 52C, each of which comprise an answer which is from a unique field of personal information 52A. In the example shown in FIG. 4G, the identity verification question 52C displayed on GUI 101 prompts the user to ask the customer for the month and day of the customer's birthday, but not the year.

In the examples shown in FIGS. 4G and 4H, answers corresponding to real personal information 52A (i.e. the correct answer to the identity verification question 52C) and fake information 52D are both displayed on GUI 101. The answers are selectable by the user of remote electronic device 20. The user may select an answer based on the answer provided by the answerer to transmit the answer provided by the answerer to system server 40 (e.g. through application interface module 80).

In some embodiments, system server 40 is configured to receive answers to the identity verifications questions 52C directly from customer device 30. For example, system server 40 may be configured to receive data corresponding to an audio input and/or a keyboard input directly from customer device 30. Where system server 40 is configured to receive data corresponding to an audio input, system server 40 may mute the customer electronic device 30 from the remote electronic device 20 while the answerer is providing their answer to the identity verification question 52C. This prevents the user of remote electronic device 20 from knowing the answer provided by the customer.

After transmitting the answer provided by the answerer to system server 40, the call flow proceeds to a decision block 222 where system server 40 and/or software application 100 is configured to determine whether the identity verification process is complete. System server 40 and/or software application 100 may determine whether the identity verification process is complete by considering the number of identity verification questions 52C answered by the answerer, the odds of the answerer guessing the correct answer to the identity verification question 52C, etc. For example, system server 40 and/or software application 100 may deem the identity verification process to be complete upon the answerer answering three identity verification questions 52C. As another example, system server 40 and/or software application 100 may deem the identity verification process to be complete upon the odds of the answerer guessing the correct answers to the identity verification questions 52C decreasing to below a threshold, for example, about 1%.

In some embodiments, system server 40 comprises an odds calculator 74 configured to calculate the likelihood of the answerer guessing the correct answer to the identity verification questions 52C. For example, an answerer has a 1 in 12 chance of correctly guessing the month of a birthday, about a 1 in 30 chance of correctly guessing the day, about a 1 in 5000 or so chance of guessing a street number, etc.

In some embodiments one or more identity verification questions are selected based at least in part on the odds that the correct answer(s) could be guessed by a person who did not know the correct answers and the sensitivity of a conversation (e.g. the more sensitive and/or confidential a conversation is, questions with lower odds of guessing the correct answer(s) are selected). In some embodiments in response to an identity verification question being answered incorrectly another identity verification question or questions having a lower (or significantly lower (e.g. more than 10 times lower, 15 times lower, 20 times lower, 100 times lower, 1000 times lower, etc.)) odds for guessing the correct answer(s) may be selected to be presented to the customer. In some embodiments the question(s) having the lower (or significantly lower) odds for guessing the correct answer is(are) presented in response to detecting that the customer has answered a question incorrectly.

If system server 40 and/or software application 100 determines that the identity verification process is incomplete, the call flow proceeds back to block 220 where further identity verification questions 52C are asked by the user of remote electronic device 20.

If system server 40 and/or software application 100 determines that the identity verification process is complete, the call flow proceeds to decision block 224. Decision block 224 comprises determining whether the answerer is the customer of customer profile 52. Decision block 224 may comprise determining whether the answerer is the customer of customer profile 52 based on the odds of the answerer guessing the correct answer(s) to the identity verification question(s) 52C.

If system server 40 and/or software application 100 determines that the answerer is not the customer of customer profile 52, the call flow proceeds to block 226 where the call is dispositioned. Dispositioning the call in block 226 may comprise shuffling the phone number 52B of the customer profile 52 back in calling queue 82, leaving an indication (e.g. in call log 52F of customer profile 52) that the answerer is not the customer of customer profile 52, etc. The call flow ends after dispositioning the call in block 226.

If system server 40 and/or software application 100 determines that the answerer is the customer of customer profile 52, the call flow proceeds to block 228 where the call is transferred (e.g. to an agent working in call center 5). Preferably, dialing platform 90 comprises call transferring functionalities which enable the call to be transferred from remote electronic device 20 to another device (e.g. a device 7 in call center 5). The call flow ends after transferring the call in block 228.

Additional Features and Variations

System 10 may optionally include systems and/or components adapted to provide one or more of the following additional features:
  system server 40 may be configured to transmit a link or "call-to-action" button to a verified customer's customer device 30 (e.g. through a text message, through a software application, etc.) which may display information or allow the verified customer to complete tasks such as making a payment, accepting an offer, electronically signing a document, etc.
  system server 40 may be configured to provide a learning platform that includes online courses, tests and certified exams. The learning platform may be provided through GUI 101 on the remote electronic device 20. Users of remote electronic device 20 may complete the courses, tests and exams through GUI 101 to achieve various certification levels that represent the skill of the user. The certification levels may be stored in user profile 54 (e.g. the certification levels may be reflected as part of user rating 54B). Users may have access to various calling campaigns (e.g. various calling queues 82) based on their certification levels stored in user profile 54.
  GUI 101 may include features (e.g. as part of metrics 54C) which allow the user of remote electronic device 20 to view details regarding their previous calls (e.g. duration of previous calls, results of previous calls), the total amount of time worked, the total amount of money earned, etc.
  system server 40 may be configured to provide gamification and/or incentives to users for using software application 100. Some example incentives include: usage incentives (e.g. a user of software application 100 is rewarded, for example, with bonus pay for engaging in a certain number of calls), accomplishment incentives (e.g. a user of software application 100 is rewarded, for example, with bonus pay for successfully transferring a certain number of calls), random incentives (e.g. a user of software application 100 is rewarded randomly or at random times for using software application 100), sponsored incentives (e.g. third party sponsors may offer rewards such as coupons for the sponsors' goods/services which can be redeemed by users software application 100), and a points program (e.g. users can earn points for calls transferred, messages left, invalid numbers identified, etc., and can convert the earned points to cash, use the points to purchase products in an online store, use the points toward subscription of software application 100, etc.).
  software application 100 may be configured to send alerts and/or push notifications to users of remote electronic device 20. The alerts may be sent when a campaign is scheduled (e.g. when a new calling queue 82 is created). Such push notifications may include information such as the campaign type (e.g. sales, fundraising, collections, healthcare, etc.), the start date and time of the campaign, the end date and time of the campaign, the duration of the campaign, the compensation rate for participating in the campaign, etc. System server 40 may be configured to transmit push notifications only to remote electronic devices 20 which are eligible to participate in the campaign.

remote electronic device 20 may be configured (e.g. by software application 100) to monitor and assess background noise (e.g. by detecting noise through microphone 22). For example, remote electronic device 20 may be configured to assess background noise when software application 100 is launched and/or periodically during a call between the user and a customer. Software application 100 may display a message (e.g. through GUI 101) on screen 26 advising the user that the background noise is at an unacceptable level. Remote electronic device 20 may be configured to record the background noise and transmit the recorded noise to system server 40.

A wide range of variations are possible within the scope of the present invention. These variations may be applied to all of the embodiments described above, as suited, and include, without limitation:

system 10 may be configured to allow remote agent devices 20 to receive incoming calls from customer devices 30 (e.g. through software application 100)—for example, an incoming customer call may be received by system 10 and automatically forwarded to a remote agent device 20 for verification of the identity of the caller as described herein. In some embodiments the agent device 20 selected to receive the incoming call is the next available remote agent device 20 in a queue. In some embodiments a remote agent device 20 selected to receive the call is based in part on the geographical origination of the call (as determined, for example, from an area code) as described herein and/or a likely identity of the caller (as determined for example from the calling telephone number and/or metadata accompanying the incoming call);

system 10 may be configured to play a message (e.g. a pre-recorded or speech synthesized message 56 stored in data store 50) to a verified customer instead of transferring the verified customer to another operator. The message may in some cases contain confidential information such as debt and/or financial information, medical and/or health care information, etc. In these cases, the user of remote electronic device 20 is disconnected from the call before the message is played and does not hear the message. System 10 may be configured to generate and provide scripts, questions and corresponding answers that facilitate activities such as sales or telemarketing. The scripts, questions and corresponding answers may help facilitate OTP (over the phone) buying and payment options.

system 10 may be configured to support a general gig economy (e.g. system 10 is not limited to call center applications and may be adapted to support any gig economy).

Interpretation of Terms

Those skilled in the art will recognize that the embodiments of the present invention involve both hardware and software elements (e.g. for remote electronic devices 20, customer devices 30, system server 40, etc.) which portions are described below in such detail required to construct and operate the method according to the embodiments of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention (e.g. software application 100, application interface module 80, etc.) may take the form of a computer program embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would further include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF, and the like, or any suitable combination of the foregoing.

Computer program code for carrying out operations for aspects of the present invention may be written in any combination of one or more programming languages, including an object oriented programming language such as Java, Smalltalk, C++, or the like or conventional procedural programming languages, such as the "C" programming language, AJAX, PHP, HTML, XHTML, Ruby, CSS, or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer, or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus, and computer program products according to embodiments of the invention. It will be understood that some blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagrams.

Unless the context clearly requires otherwise, throughout the description and the claims:
  "comprise", "comprising", and the like are to be construed in an inclusive sense, as opposed to an exclusive or exhaustive sense; that is to say, in the sense of "including, but not limited to";
  "connected", "coupled", or any variant thereof, means any connection or coupling, either direct or indirect, between two or more elements; the coupling or connection between the elements can be physical, logical, or a combination thereof;
  "herein", "above", "below", and words of similar import, when used to describe this specification, shall refer to this specification as a whole, and not to any particular portions of this specification;
  "or", in reference to a list of two or more items, covers all of the following interpretations of the word: any of the items in the list, all of the items in the list, and any combination of the items in the list;
  the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g. a software module, processor, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A system for performing call center tasks with the assistance of a human operator, the system comprising:
   a remote electronic device having a speaker, a microphone and a screen;
   a system server in communication with the remote electronic device over a first network, the system server comprising:
      a data store configured to store a plurality of customer profiles, each of the customer profiles comprising personal information about a customer, a phone number of the customer, and one or more identity verification questions for identifying the customer, wherein the one or more identity verification questions comprise one or more of fake personal information and instructions to provide wrong answers to a subset of the one or more identity verification questions, and the one or more identity verification questions are designed to evoke answers comprising one or more of a "YES", a "NO" and the fake personal information; and
      a dialing platform configured to connect the remote electronic device with a customer device through a second network to initiate a voice call between the human operator operating the remote electronic device and the customer operating the customer device;
   wherein the system server is configured to transmit the one or more identity verification questions to the remote electronic device after the remote electronic device establishes connection with the customer device through the dialing platform; and
   wherein the remote electronic device is configured to sequentially display the one or more identity verification questions on the screen of the remote electronic device as the human operator is engaging in the voice call with the customer.

2. The system according to claim 1 wherein the system server is configured to generate fake information based on personal information about the customer and wherein the one or more identity verification questions comprises the generated fake information.

3. The system according to claim 1 further comprising a calling queue configured to store the phone number of each of the plurality of customer profiles.

4. The system according to claim 3 wherein the dialing platform is configured to connect the remote electronic device with the customer device by dialing a random one of the phone numbers from the calling queue.

5. The system according to claim 1 wherein the remote electronic device is configured to delete the one or more identity verification questions from the remote electronic device after the voice call is terminated.

6. The system according to claim 1 wherein a plurality of the identity verification questions are generated using different sub-fields of the personal information and only one of the plurality of identity verification questions is included in the identity verification questions transmitted to the remote electronic device.

7. The system according to claim 1 wherein the data store is configured to store for each of the identity verification questions a corresponding correct answer option and one or more corresponding incorrect answer options.

8. The system according to claim 7 wherein the remote electronic device is configured to display the correct answer option and the one or more incorrect answer options together with the identity verification question on the screen of the remote electronic device.

9. The system according to claim 1 wherein the first network comprises an internet network and a VOIP network.

10. The system according to claim 1 wherein the second network comprises a PSTN network.

11. A human-assisted method for verifying the identity of a customer engaging in a call with an operator over an electronic device, the method comprising:
    transmitting a series of identity verification questions and corresponding answer options to the device, the series of identity verification questions comprising one or more of fake personal information and instructions to provide wrong answers to a subset of the one or more identity verification questions, and the answer options comprising one or more of a "YES", a "NO" and fake personal;
    sequentially displaying the series of identity verification questions on a screen of the device to prompt the operator to ask the customer the series of identity verification questions through a microphone of the device;
    for each question of the series of identity verification questions, prompting the operator to select at least one of the corresponding answer options after receiving an answer from the customer over a speaker of the device; and
    verifying the identity of the customer based on the selected answer options.

12. The method according to claim 11 wherein each of the series of questions comprises a piece of personal information about the customer and one or more pieces of fake information.

13. The method according to claim 11 wherein the answer options do not contain personal information about the customer.

14. The method according to claim 11 wherein the correct answer option comprises fragments of a piece of personal information and the one or more incorrect answer options comprise fake information.

15. The method according to claim 11 wherein a plurality of the identity verification questions are generated using differnt sub-fields of the personal information and only one of the plurality of identity verification questions is included in the series of identity verification questions transmitted to the electronic device.

16. A system for facilitating an anonymous call between an operator and a customer, the system comprising:
    a system server having a plurality of calling queues, the system server configured to store a plurality of phone numbers in the plurality of calling queues based on a security sensitivity rating of customer profiles associated with the phone numbers, and a dialing platform operable to connect to a plurality of phones corresponding to the plurality of phone numbers over a first network;
    an electronic device connected to the system server over a second network, the electronic device operable by the operator to transmit a signal to the system server over the second network, the signal prompting the dialing platform to select one of the plurality of phone numbers in the calling queue and dial the selected phone number to connect to a corresponding one of the plurality of phones over the first network;

wherein the electronic device connects to the dialing platform over the second network upon the dialed phone connecting to the dialing platform; and wherein the system is configured to connect the operator to a calling queue based on a tier of the operator.

17. The system of claim 16 wherein the system is configured to estimate the geolocations of the plurality of phones and to connect the operator to phones located at geolocations different from a geolocation of the operator.

* * * * *